United States Patent [19]

Fuchs et al.

[11] Patent Number: 4,778,669

[45] Date of Patent: Oct. 18, 1988

[54] PREPARATION OF AQUEOUS SOLUTIONS OF FREE HYDROXYLAMINE

[75] Inventors: Hugo Fuchs, Ludwigshafen; Franz-Josef Weiss, Neuhofen; Erwin Thomas, Freinsheim; Josef Ritz, Ludwigshafen, all of Fed. Rep. of Germany

[73] Assignee: BASF Aktiengesellschaft, Ludwigshafen, Fed. Rep. of Germany

[21] Appl. No.: 5,700

[22] Filed: Jan. 22, 1987

[30] Foreign Application Priority Data

Jan. 22, 1986 [DE] Fed. Rep. of Germany ....... 3601803

[51] Int. Cl.$^4$ .............................................. C01B 21/14
[52] U.S. Cl. ......................................... 423/387; 203/6
[58] Field of Search ............................. 203/6; 423/387

[56] References Cited

U.S. PATENT DOCUMENTS

| 3,351,426 | 11/1967 | Leaver et al. | 423/387 |
|---|---|---|---|
| 4,576,804 | 3/1986 | Grosskinsky et al. | 423/387 |

FOREIGN PATENT DOCUMENTS

| 0108294 | 5/1984 | European Pat. Off. | 423/387 |
|---|---|---|---|
| 1247284 | 8/1967 | Fed. Rep. of Germany | 423/387 |
| 1247282 | 8/1967 | Fed. Rep. of Germany | 423/387 |

OTHER PUBLICATIONS

Kirk-Othmer, *Encyclopedia of Chemical Technology*, Third Edition, vol. 7 (1979), John Wiley & Sons, pp. 883-885.

*Handbook of Chemistry & Physics*, 57th Edition, CRC Press (1976), p. B-117.

*Primary Examiner*—John Doll
*Assistant Examiner*—Wayne A. Langel
*Attorney, Agent, or Firm*—Keil & Weinkauf

[57] ABSTRACT

Aqueous solutions of free hydroxylamine are prepared by a process in which (a) hydroxylammonium sulfate is reacted with ammonia in a lower alkanol as solvent, and a solution of free hydroxylamine and solid ammonium sulfate with residues of hydroxylammonium sulfate is obtained, (b) solid ammonium sulfate and hydroxylammonium sulfate are separated off from the resulting reaction mixture, and an alcoholic solution of free hydroxylamine is obtained as the filtrate, (c) a stabilizer and water are added to the resulting alcoholic solution of free hydroxylamine, and (d) the alkanol is distilled off from the alcoholic solution containing free hydroxylamine, the stabilizer and water.

7 Claims, No Drawings

PREPARATION OF AQUEOUS SOLUTIONS OF FREE HYDROXYLAMINE

Highly concentrated aqueous solutions of free hydroxylamine are required in industry for special purposes. German Published Application DES No. 1,247,282 discloses a process in which alcoholic solutions of free hydroxylamine are obtained by reacting hydroxylammonium sulfate with ammonia in alcohol as a solvent and isolating the ammonium sulfate. However, for a number of intended uses, alcoholic solutions cannot be employed. On the other hand, special precautions have to be taken when transporting such solutions, owing to their flammability. The same applies to the process described in European Patent Application No. 108,294, in which alcoholic solutions of free hydroxylamine are obtained by reacting hydroxylammonium sulfate with a methanolic alkali metal hydroxide solution and isolating the resulting alkali metal sulfate. Attempts have already been made to prepare aqueous solutions of free hydroxyl amine by electrodialysis of aqueous solutions of hydroxylammonium sulfate in electrolysis cells containing semipermeable partitions. However, processes of this type are technically more complicated and to date have not been introduced industrially. It is also known that aqueous solutions of free hydroxylamine can be obtained by reacting aqueous hydroxylammonium sulfate solutions with barium oxide. However, this procedure presents the problem of barium sulfate filtration.

It is an object of the present invention to provide a process for the preparation of aqueous solutions of free hydroxylamine which is simple to carry out and which gives aqueous solutions having a variable hydroxylamine content in high yield and with little loss of hydroxylamine.

We have found that this object is achieved by a process for the preparation of aqueous solutions of free hydroxylamine, wherein
(a) hydroxylammonium sulfate is reacted with ammonia in a lower alkanol as solvent, and a solution of free hydroxylamine and solid ammonium sulfate with residues of hydroxylammonium sulfate is obtained,
(b) solid ammonium sulfate and residual hydroxylammonium sulfate are separated off from the resulting reaction mixture,
(c) a stabilizer and water are added to the resulting alcoholic solution of free hydroxylamine, and
(d) the alkanol is distilled off from the resulting solution containing free hydroxylamine, the alkanol, the stabilizer and water.

The novel process has the advantages that it is not very expensive and can be carried out in a simple manner, aqueous solutions of free hydroxylamine having a variable content of free hydroxylamine are obtained, the process gives high yields and the losses of hydroxylamine are low, and finally the content of foreign ions in the aqueous hydroxylamine solution is low.

According to the invention, solid hydroxylammonium sulfate is used as a starting material. Finely divided hydroxylammonium sulfate, e.g. having a particle size of from 0.001 to 0.2 mm, is advantageously used.

Lower alkanols, in particular those of 1 to 3 carbon atoms, such as methanol, ethanol, propanol or isopropanol, or mixtures of these, are used as solvents for the free hydroxylamine to be produced. Ethanol and methanol and mixtures of methanol and propanol, for example in a ratio of 1:1, have proven particularly suitable. It has proven useful to employ anhydrous alkanols in order to obtain a very low content of foreign ions. From 2 to 10 parts by weight of alkanols are advantageously employed per part by weight of hydroxylammonium sulfate.

According to the invention, the hydroxylammonium sulfate is reacted with ammonia. Advantageously, the gaseous ammonia is passed into a suspension of solid hydroxylammonium sulfate in the abovementioned alkanols. It has proven useful to employ ammonia in less than the stoichiometric amount, based on the amount of hydroxylammonium sulfate used, for example from 0.3 to 2 moles of ammonia per mole of hydroxylammonium sulfate. This is advantageously achieved by first passing gaseous ammonia into a suspension of solid hydroxylammonium sulfate in the stated alcohols until a slight excess is present, and then adding further solid hydroxylammonium sulfate to reduce the amount of ammonia to below the stoichiometric amount.

The reaction is advantageously carried out at from 5° to 70° C., in particular from 10° to 30° C. When the reaction is complete, the reaction mixture is advantageously cooled to a temperature of from $-10°$ to 25° C. This gives an alcoholic solution of free hydroxylamine and solid ammonium sulfate with residual hydroxylammonium sulfate.

In stage b), solid ammonium sulfate and residual hydroxylammonium sulfate are separated off from the abovementioned solution, for example by filtration or centrifuging. This gives a filter cake of solid ammonium sulfate and residual hydroxylammonium sulfate, and an alcoholic solution of free hydroxylamine as the filtrate.

In the subsequent stage c), a stabilizer and water are added to the alcoholic solution of free hydroxylamine in an amount required to give the desired final concenration of hydroxylamine. Advantageously, the water is free of heavy metal ions.

Examples of suitable stabilizers are hydroxyquinaldines, such as 8-hydroxyquinaldine, flavones, such as morin, hydroxyquinolines, such as 8-hydroxyquinolin, and hydroxyanthraquinones, such as quinalizarin, which may be used in combination with polyhydroxyphenols, such as pyrogallol. Other suitable stabilizers are benzonitrile, benzamidoxime, N-phenyl-N-hydroxythiourea, reductones and/or reductonates, e.g. 2,3-didehydrohexono-1,4-lactone, as well as alkali metal salts of ethylenediaminetetraacetic acid. The concentration of stabilizers is advantageously from $5.10^{-4}$ to 1, in particular $5.10^{-3}$ to $5.10^{-2}$, % by weight, based on free hydroxylamine. Stabilizers which have proven particularly useful are chelate-forming compounds, in particular 8-hydroxyquinaldine and 8-hydroxyquinoline.

In the subsequent stage d), alkanols are distilled off from the aqueous alcoholic solutions of free hydroxylamine which have been stabilized in this manner. During this procedure, the temperature is advantageously kept below 30° C., for example at from 5° to 20° C. The alkanols are therefore advantageously distilled off under reduced pressure, for example from 20 to 300 mbar.

It has proven useful to recycle the filter cake from stage b) which still contains hydroxylammonium sulfate, to stage a) together with fresh hydroxylammonium sulfate. It is also advantageous if the alcohols which are obtained as the distillate in stage d) and which contain small amounts, for example up to 3% by weight of free hydroxylamine, are recycled to stage a) or c).

Aqueous solutions of free hydroxylamine which are obtainable by the process of the invention contain, as a rule, from 5 to 60, in particular from 20 to 50, % by weight of free hydroxylamine and are useful for the reaction with pure acids to prepare very pure hydroxylammonium salts as polymerization regulators and reactants for the preparation of special organic and inorganic intermediates.

The Example which follows illustrates the process according to the invention.

EXAMPLE 124 g of very finely powdered hydroxylammonium sulfate having a particle size of from 0.01 to 0.1 mm are suspended in 500 ml of methanol in a 2 l four-necked flask equipped with a gas inlet frit, a thermometer, a reflux condenser and an Ultra-Turrax stirrer. From 34 to 36 l of ammonia gas are passed in at from 15° to 20° C. for about 1.5 hours. The suspension is stirred at 6000 rpm. After the ammonia has been passed in, a further 40 g of hydroxylammonium sulfate are added and stirring is continued for a further hour at from 15° to 20° C.

The reaction mixture is then filtered, and the residue is washed with 100 ml of methanol. The filtrate, amounting to 456 g, contains 52 g of free hydroxylamine in methanol. The filtration residue contains 13.8 g of hydroxylamine in the form of unconverted hydroxylammonium sulfate. Thus, a total of 65.8 g of hydroxylamine is recovered out of the 66.0 g of hydroxylamine employed. The residue can be combined with fresh hydroxylammonium sulfate and used for a further batch. About 0.001 mole of 8-hydroxyquinoline per mole of free hydroxylamine, and 76 g of water, are then added to the methanolic solution. The methanol is removed in a rotary evaporator at no higher than 30° C. and under from 30 to 40 mbar. 115 g of an aqueous distillation residue containing 45 g of free hydroxylamine are obtained.

The methanol distilled off contains 4.3 g of free hydroxylamine. This too can be reused as a solvent for a further batch in stage a) or c).

Out of the 52 g of free hydroxylamine used for the distillation, 45 g are obtained as an aqueous solution and 4.3 g in the methanol distilled off, i.e. 49.3 g are recovered, or 94.8%, based on the hydroxylamine used for the distillation.

If a stabilizer is omitted the yield of free hydroxylamine in the aqueous phase together with the hydroxylamine in the methanol distilled off is only about 82%.

We claim:

1. A process for the preparation of an aqueous solution of free hydroxylamine which comprises:
    (a) reacting hydroxylammonium sulfate with ammonia in a lower alkanol as a solvent to form a solution of free hydroxylamine and solid ammonium sulfate with residues of hydroxylammonium sulfate;
    (b) separating the solid ammonium sulfate and hydroxylammonium sulfate residues from the reaction mixture obtained in stage (a), whereby an alkanol solution of free hydroxylamine remains;
    (c) adding a stabilizer and water to the alcohol solution of free hydroxylamine, and
    (d) distilling off the alkanol from the alcohol solution containing free hydroxylamine, the stabilizer and water at a temperature below 30° C. and under reduced pressure.

2. The process of claim 1, wherein a temperature of from 5° to 70° C. is maintained in stage (a).

3. The process of claim 1, wherein ammonia is used in an amount which is less than the stoichiometric amount.

4. The process of claim 1, wherein a chelate-forming stabilizer is used.

5. The process of claim 1, wherein the solid mixture of ammonium sulfate and hydroxylammonium sulfate obtained in stage (b) is reused, together with fresh hydroxylammonium sulfate, in stage (a).

6. The process of claim 1, wherein the alkanols obtained as the distillate in stage (d) are recycled to stage (a) or (c).

7. The process of claim 1, wherein an alkanol of 1 to 3 carbon atoms is used as the solvent.

* * * * *